United States Patent [19]

Counts

[11] Patent Number: 5,008,599
[45] Date of Patent: Apr. 16, 1991

[54] POWER FACTOR CORRECTION CIRCUIT

[75] Inventor: Richard C. Counts, Dallas, Tex.

[73] Assignee: USI Lighting, Inc., San Leandro, Calif.

[21] Appl. No.: 479,650

[22] Filed: Feb. 14, 1990

[51] Int. Cl.$^5$ .............................................. H05B 37/02
[52] U.S. Cl. .................................. 315/247; 315/240; 315/243; 315/307
[58] Field of Search ............... 315/240, 243, 247, 289, 315/290, 307; 323/222, 285; 363/89, 98

[56] References Cited

U.S. PATENT DOCUMENTS 4,952,849  8/1990  Fellows et al. ...................... 315/307

FOREIGN PATENT DOCUMENTS 0059053  9/1982  European Pat. Off. ............ 315/247

*Primary Examiner*—David Mis
*Attorney, Agent, or Firm*—Thomas E. Schatzel

[57] ABSTRACT

In a ballast circuit for producing a DC signal with a high voltage amplitude, a capacitor is connected to a circuit output. The capacitor stores a charge which provides the high voltage amplitude of the DC signal. Current from an inductor is used to charge the capacitor. A current gate, when it is turned on, drains current from the inductor. A control circuit turns the current gate on and off so that the amplitude of the current drawn from the incoming AC voltage signal is in phase with the amplitude of the voltage of the incoming AC voltage signal. The control circuit includes a ramp generator which generates a pulse modulation reference signal with a varying voltage amplitude and a comparator which compares the pulse modulation reference signal with the incoming AC voltage signal after the incoming AC voltage signal has been rectified and the voltage divided by a voltage divider. The comparator produces a first modulated signal. The control circuit also includes a second comparator which compares the pulse modulation reference signal with a feedback signal to produce a second modulated signal. A logical AND is performed on the first modulated and the second modulated signal to produce a control signal.

9 Claims, 2 Drawing Sheets

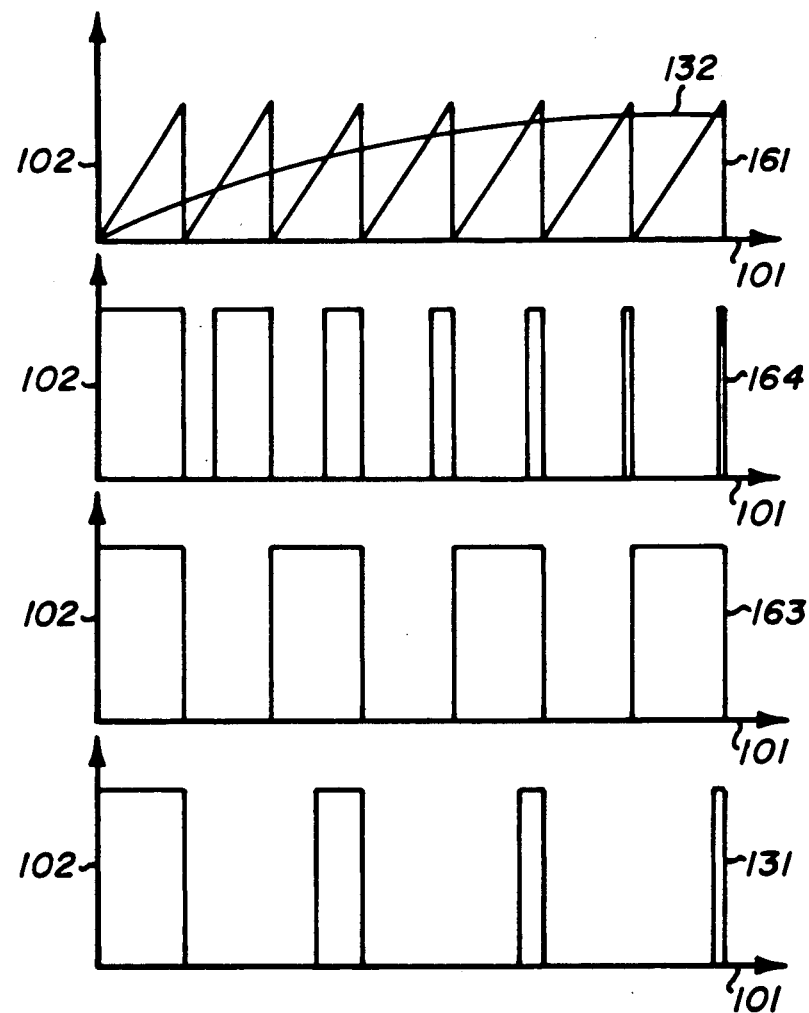
Fig_3

POWER FACTOR CORRECTION CIRCUIT

BACKGROUND

The present invention concerns a circuit for correcting the power factor within a fluorescent lamp system.

Ballast circuitry within a fluorescent lamp system is used to convert an incoming AC voltage signal to a high DC voltage signal. The incoming AC voltage signal typically has a RMS voltage of either 120 volts or 277 volts. The high DC voltage is converted to a high frequency AC voltage which is applied to a series resonant/lamp circuit.

In order to best conserve power, the amplitude of the current drawn from the incoming AC voltage signal should be in phase with the amplitude of the voltage of the incoming AC voltage signal. The goal of the present invention is to provide inexpensive ballast circuitry which allows for high power conservation.

SUMMARY OF THE INVENTION

In accordance with the preferred embodiment of the present invention, a ballast circuit for producing a DC signal with a high voltage amplitude is presented. In the ballast circuit, a capacitor connected to a circuit output stores a charge which provides the high voltage amplitude of the DC signal. Current from an inductor is used to charge the capacitor. A current gate, when it is turned on, drains current from the inductor. Energy is thus stored in the inductor when the current gate is turned on. When the current gate is turned off, current from the inductor charges the capacitor.

A control circuit turns the current gate on and off so that the amplitude of the current drawn from the incoming AC voltage signal is in phase with the amplitude of the voltage of the incoming AC voltage signal. The control circuit includes a ramp generator which generates a pulse modulation reference signal with a varying voltage amplitude and a comparator which compares the pulse modulation reference signal with the incoming AC voltage signal after the incoming AC voltage signal has been rectified and the voltage divided by a voltage divider. The comparator produces a first modulated signal.

The control circuit also includes a second comparator which compares the pulse modulation reference signal with a feedback signal to produce a second modulated signal. The feedback signal is proportional to the DC signal. A logical AND is performed on the first modulated and the second modulated signal. The resultant signal is then amplified to produce a control signal which is used to turn the current gate on and off.

The control circuit is inexpensive to manufacture and yet allows the ballast circuit to accomplish the goal of drawing off current from the incoming AC voltage signal in phase with the amplitude of the voltage of the incoming AC voltage signal.

BRIEF DESCRIPTION OF THE DRAWINGS

FIG. 3 shows voltage amplitude as a function of time for various signals within the correction circuit of FIG. 2 in accordance with the preferred embodiment of the present invention.

DESCRIPTION OF THE PREFERRED EMBODIMENT

Figure 1:
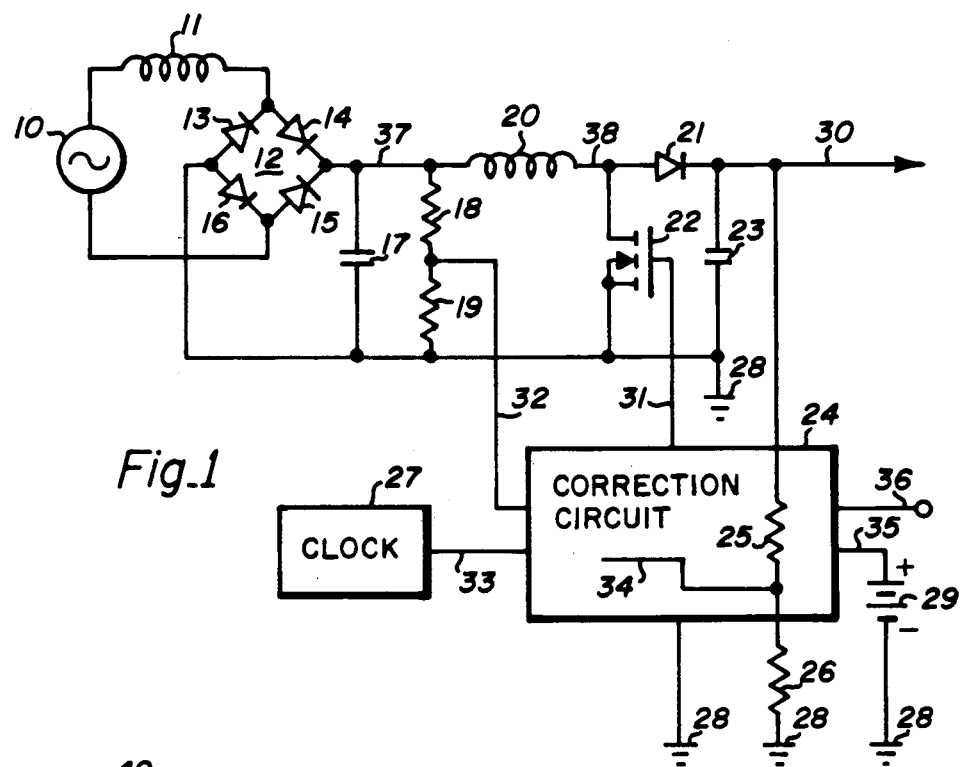
FIG. 1 shows ballast circuitry in accordance with a preferred embodiment of the present invention.

In FIG. 1 is shown ballast circuitry which is used in a fluorescent lamp system. An AC signal source 10 represents the AC signal from a power source such as a standard electrical outlet. The RMS voltage of the AC signal is typically 120 volts or 277 volts. An inductor 11 is used to provide input inductance to the incoming AC voltage signal before the AC signal is connected to a rectifier 12. Rectifier 12 consists of rectifiers 13, 14, 15 and 16 connected as shown. Rectifier 12 produces a rectified AC signal which is placed on a line 37.

Charge stored within a capacitor 23 is used to provide a high DC level signal on a line 30. Capacitor 23 is charged by current provided from an inductor 20 through a diode 21. When the AC signal from AC signal source 10 is at greater voltage amplitudes, current energy is stored in inductor 20. When the AC signal is at lesser voltage amplitudes, energy stored in inductor 20 is used to charge capacitor 23. A capacitor 17 is used to store charge utilized to maintain current through inductor 20.

Energy is stored within inductor 20 by turning on a gate 22. When gate 22 is turned on, an end 38 of inductor 20 is connected to a ground 28. This causes energy in the form of current flow to be stored in inductor 20. When gate 22 is turned off, this current is forced to flow through diode 21 and to charge capacitor 23. Gate 22 is switched on and off by a control signal on a line 31. The control signal is generated by a correction circuit 24. Correction circuit 24 causes gate 22 to be switched on and off in a pattern such that current drawn from AC signal source 10 vaires synchronously with the voltage amplitude of the AC signal from AC signal source 10.

Correction circuit 24 receives on a line 33 a clock signal from a clock 27. Correction circuit 24 receives on a line 32 a voltage divided signal based on the rectified AC signal. The voltage amplitude of the rectified AC signal is proportionately reduced by a voltage divider consisting of a resistor 18 and a resistor 19.

Correction circuit 24 also receives as feedback the high DC level signal on line 30. When the RMS voltage of AC signal source 10 is 120 volts, the high DC level signal on line 30 may be, for example, set at 300 volts. When the RMS voltage of AC signal source 10 is 277 volts, the high DC level signal on line 30 may be, for example, set at 450 volts.

The high DC level signal is proportionately reduced by a voltage divider consisting of a resistor 25 within correction circuit 24 and a resistor 26 external to correction circuit 24. The divided feedback voltage is placed on a line 34. Power to correction circuit 24 is supplied by a DC voltage placed on a line 35 by a DC power source 29. Correction circuit 24 is also connected to ground 28. Correction circuit 24 may be inhibited/enabled by an inhibit/enable signal placed on a line 36.

Figure 2:
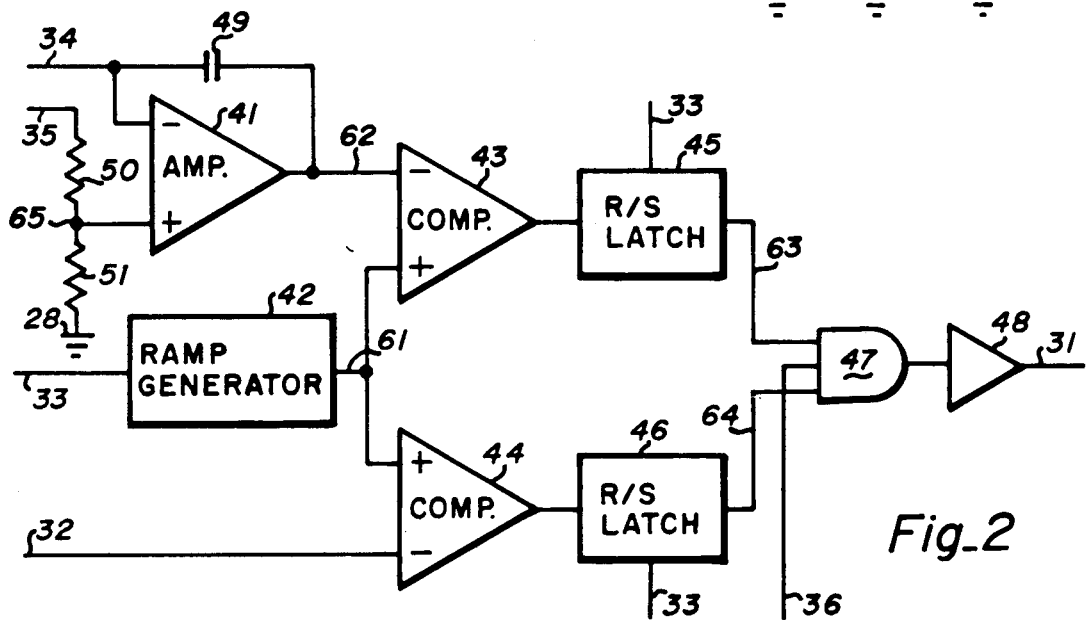
FIG. 2 shows a block diagram of a correction circuit within the ballast circuitry of FIG. 1, in accordance with the preferred embodiment of the present invention.

FIG. 2 shows a block diagram of correction circuit 24. A ramp generator 42 receives the clock signal on line 33 and produces a ramp signal on a line 61. The ramp signal on line 61 is used as input to a comparator 43 and a comparator 44. Comparator 44 compares the ramp signal with the relative voltage amplitude of the rectified AC signal on line 32. In order to prevent noise on line 32 from causing oscillation in the output of comparator 44, the output signal of comparator 44 may be latched by an RS latch 46. The output signal of RS latch 46 is placed on a line 64. The clock signal on line 33 is used to reset RS latch 46.

Comparator 43 compares the ramp signal with an amplified signal on line 62 generated by an "Error" amplifier 41. Error amplifier 41 has a gain of approximately 10. The voltage of the amplified signal on line 62 is proportional to the voltage differential between the divided feedback voltage on line 34 and an internal reference voltage. The internal reference voltage is determined by a voltage divider consisting of a resistor 50 and a resistor 51 connected between line 35 and ground 28. Resistors 50 and 51 are internal to correction circuit 24 so that voltage at a location 65 is approximately 14.5 volts. A capacitor 49 is connected as shown in order to provide negative feedback to amplifier 41 in order to prevent oscillation. Capacitor 49 may be for example 1 microfarad (16 volts). In order to prevent noise on line 62 from causing oscillation in the output of comparator 43, the output signal of comparator 43 may be latched by an RS latch 45. The output signal of RS latch 45 is placed on a line 63. The clock signal on line 33 is used to reset RS latch 45.

A logical AND gate 47 receives as input the signal on line 63 and the signal on line 64. The output of logical AND gate 47 is amplified by an amplifier 48 to produce the control signal on line 31. The inhibit/enable signal on line 36 is used to inhibit/enable logic AND gate 47 as shown.

FIG. 3 shows voltage amplitude on an axis 102 as a function of time on an axis 101 for various signals within correction circuit 24. A voltage amplitude 132 is the voltage amplitude of the voltage divided signal on line 32 and is proportional to the voltage amplitude of the rectified AC signal on line 37. A voltage amplitude 161 is the voltage amplitude of the ramp signal on line 61. A voltage amplitude 164 is the voltage amplitude of the output signal of RS latch 46 placed on line 64. A voltage amplitude 163 is the voltage amplitude of the output signal of RS latch 45 placed on line 63. A voltage amplitude 131 is the voltage amplitude of the control signal on line 31.

As may be seen from FIG. 3, when voltage amplitude 161 is greater than voltage amplitude 132, voltage amplitude 164 is at a logic 1. Otherwise, voltage amplitude 164 is at a logic 0. Voltage amplitude 131 is obtained as a result of performing a logical AND of voltage amplitude 163 and voltage amplitude 164.

As may be seen from FIG. 3, the higher the value of voltage amplitude 132, the shorter the duration voltage amplitude 131 is at logic 1. The implication of this is that when the voltage amplitude of the rectified signal on line 37 is at a maximum, gate 22 is primarily turned off. When the voltage amplitude of the rectified signal on line 37 is at a minimum, gate 22 is primarily turned on and energy is being stored within inductor 20 in order to charge capacitor 23 when gate 22 is turned off.

When the components of the ballast circuitry are chosen appropriately, it is possible to cause the amplitude of the current drawn from AC signal source 10 to be in phase with the amplitude of the voltage of AC signal source 10. For example, when the RMS voltage of AC signal source 10 is 120 volts the following values may be used for the components shown in FIG. 2. Inductor 11 is 1.25 millihenries. Diodes 13, 14, 15 and 16 are type 1N4003. Capacitor 17 is 1.0 micro farads (250 volts). Inductor 20 is 0.750 millihenries. Resistor 18 is 430 kilohms. Resistor 19 is 10 kilohms. Gate 22 is type IRF 720, available from Siliconix Inc., having a business address of 2201 Laurelwood Road, Santa Clara, CA 95056. Diode 21 is type FR105 available from Diodes Inc., having a business address of 9957 Canoga Avenue, Chatsworth, CA 91311. Capacitor 23 is 22 microfarads (350 volts). Resistor 25 is 510 kilohms. Resistor 26 is 16.3 kilohms.

When the RMS voltage of AC signal source 10 is 277 volts the following values may be used for the components shown in FIG. 2. Inductor 11 is 1.25 millihenries. Diodes 13, 14, 15 and 16 are type 1N4005. Capacitor 17 is 0.33 micro farads (450 volts). Inductor 20 is 0.450 millihenries. Resistor 18 is 430 kilohms. Resistor 19 is 3.6 kilohms. Gate 22 is type IRF 820. Diode 21 is type FR105 available from Diodes Inc. Capacitor 23 is 33 microfarads (450 volts). Resistor 25 is 510 kilohms. Resistor 26 is 23.6 kilohms.

I claim:

1. A ballast circuit for producing on a circuit output a DC signal with a high voltage amplitude, the ballast circuit comprising:

a power source for providing an AC signal;

rectifying means, coupled to the power source, for rectifying the AC signal to produce a rectified AC signal;

voltage dividing means, coupled to the rectifying means, for dividing voltage of the rectified AC signal to produce a voltage divided signal;

capacitance means, coupled to the circuit output, for storing a charge;

inductance means, coupled to the rectifying means, for providing a current to charge the capacitance means;

diode means, coupled between the capacitance means and the inductance means, for allowing current to flow from the inductance means to the capacitance means to charge the capacitance means, and for not allowing current to flow from the capacitance means to the inductance means;

current gate means for draining current from the inductance means when the current gate means is turned on; and, control circuitry, coupled to the current gate means and to the voltage dividing means, for turning the current gate means on and off, the control circuitry including ramp generator means for generating a pulse modulation reference signal with a varying voltage amplitude, and first comparator means, coupled to the ramp generator and to the voltage divider, for comparing the pulse modulation reference signal with the voltage divided signal to produce a first modulated signal.

2. A ballast circuit as in claim 1, wherein the control circuitry additionally includes:

feedback means, coupled to the circuit output for generating a feedback signal based on the high voltage amplitude of the DC signal, second comparator means, coupled to the feedback means and to the ramp generator means, for comparing the feedback signal with the pulse modulation reference signal to produce a second modulated signal, and summing means for performing a logical AND function on the first modulated signal and the second modulated signal to produce a control voltage used for turning the current gate means on and off.

3. A ballast circuit as in claim 2, wherein the summing means includes:
- first latch means, coupled to the first comparator means, for latching output of the first comparator means to produce first latched signal,
- second latch means, coupled to the second comparator means, for latching output of the second comparator means to produce a second latched signal,
- logic gate means, coupled to the first latch means and to the second latch means, for performing a logical AND on the first latched signal and the second latched signal to produce an unamplified control signal, and
- amplification means, coupled to the logic gate means and to the current gate means for amplifying the unamplified control signal to produce an amplified signal used to control the current gate means.

4. In a ballast circuit for producing on a circuit output a DC signal with a high voltage amplitude, the ballast circuit including an input for receiving an AC signal; a capacitor, coupled to the circuit output for storing a charge; an inductor, coupled to the input, which provides a current to charge the capacitor; a current gate for draining current from the inductor when the current gate is turned on; and; control circuitry for turning the current gate on and off, wherein the control citcuitry comprises:
- ramp generator means for generating a pulse modulation reference signal with a varying voltage amplitude,
- first comparator means, coupled to the ramp generator, for comparing the pulse modulation reference signal with a voltage divided signal to produce a first modulated signal, wherein the first modulated signal is used in generating a control voltage used to switch the current gate on and off and wherein the voltage divided signal is a voltage amplitude proportional to the absolute value of a voltage amplitude of the AC signal.

5. A ballast circuit as in claim 4, wherein the control circuitry additionally includes:
- feedback means, coupled to the circuit output for generating a feedback signal based on the high voltage amplitude of the DC signal,
- second comparator means, coupled to the feedback means and to the ramp generator means, for comparing the feedback signal with the pulse modulation reference signal to produce a second modulated signal, and
- summing means for performing a logical AND function on the first modulated signal and the second modulated signal to produce the control voltage.

6. A ballast circuit as in claim 5, wherein the summing means includes:
- first latch means, coupled to the first comparator means, for latching output of the first comparator means to produce a first latched signal,
- second latch means, coupled to the second comparator means, for latching output of the second comparator means to produce a second latched signal,
- logic gate means, coupled to the first latch means and to the second latch means, for performing a logical AND on the first latched signal and the second latched signal to produce an unamplified control signal, and
- amplification means, coupled to the logic gate means and to the current gate for amplifying the unamplified control signal to produce and amplified signal used to control the current gate.

7. In a ballast circuit for producing on a circuit output a DC signal with a high voltage amplitude, the ballast circuit including an input for receiving an AC signal; a capacitor, coupled to the circuit output for storing a charge; an inductor, coupled to the input, which provides a current to charge the capacitor; and a current gate for draining current from the inductor when the current gate is turned on; a method for turning the current gate on and off, the method comprising the steps of:
- (a) generating a pulse modulation reference signal with a varying voltage amplitude,
- (b) comparing the pulse modulation reference signal with a voltage divided signal to produce a first modulated signal, wherein the first modulated signal is used in generating a control voltage used to switch the current gate on and off and wherein the voltage divided signal is a voltage amplitude proportional to the absolute value of a voltage amplitude of the AC signal.

8. A method as in claim 7 additionally comprising the steps of:
- (c) generating a feedback signal based on the high voltage amplitude of the DC signal,
- (d) comparing the feedback signal with the pulse modulation reference signal to produce a second modulated signal, and
- (e) performing a logical AND function on the first modulated signal and the second modulated signal to produce the control voltage.

9. A method as in claim 8 wherein step (e) comprises the substeps of:
- (e1) latching output of a first comparator means to produce a first latched signal,
- (e2) latching output of a second comparator means to produce a second latches signal,
- (e3) performing a logical AND on the first latched signal and the second latched signal to produce an unamplified control signal, and
- (e4) amplifying the unamplified control signal to produce an amplified signal used to control the current gate.

* * * * *